(12) United States Patent
Park

(10) Patent No.: US 11,890,939 B2
(45) Date of Patent: Feb. 6, 2024

(54) DRIVER ASSISTANCE SYSTEM

(71) Applicant: HL KLEMOVE CORP., Incheon (KR)

(72) Inventor: Jiyeol Park, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 386 days.

(21) Appl. No.: 17/220,926

(22) Filed: Apr. 2, 2021

(65) Prior Publication Data

US 2021/0309243 A1 Oct. 7, 2021

(30) Foreign Application Priority Data

Apr. 3, 2020 (KR) .................. 10-2020-0041009

(51) Int. Cl.
- *B60K 6/48* (2007.10)
- *B60W 50/12* (2012.01)
- *B60W 30/09* (2012.01)
- *B60W 30/14* (2006.01)
- *B60W 60/00* (2020.01)
- *G06V 20/58* (2022.01)
- *G06V 10/80* (2022.01)

(52) U.S. Cl.
CPC .............. *B60K 6/48* (2013.01); *B60W 30/09* (2013.01); *B60W 30/14* (2013.01); *B60W 50/12* (2013.01); *B60W 60/0016* (2020.02); *G06V 10/80* (2022.01); *G06V 20/58* (2022.01); *B60W 2420/403* (2013.01); *B60W 2420/52* (2013.01); *B60W 2554/4045* (2020.02)

(58) Field of Classification Search
None
See application file for complete search history.

(56) References Cited

U.S. PATENT DOCUMENTS

2009/0088925 A1* 4/2009 Sugawara .............. B60W 30/12
340/436

FOREIGN PATENT DOCUMENTS

| JP | 5304735 | 10/2013 |
|---|---|---|
| JP | 2014-58229 | 4/2014 |
| KR | 2000-0055183 | 9/2000 |
| KR | 10-1511864 | 4/2015 |
| KR | 10-2019-0083317 | 7/2019 |

OTHER PUBLICATIONS

Office Action dated Nov. 18, 2021 for Korean Patent Application No. 10-2020-0041009 and it s English machine translation from Global Dossier.
Office Action dated Apr. 26, 2021 for Korean Patent Application No. 10-2020-0041009 and it s English machine translation by Google Translate.

* cited by examiner

*Primary Examiner* — Alan D Hutchinson
(74) *Attorney, Agent, or Firm* — Ladas & Parry, LLP

(57) ABSTRACT

A driver assistance system includes a first sensor installed in a vehicle to have a front view of a vehicle, and configured to obtain front image data; a second sensor installed in the vehicle to have a front detection field of view of the vehicle and selected from a group consisting of a radar sensor and a LiDAR sensor, configured to obtain front detection data; a third sensor installed in the vehicle to have a side detection field of view of the vehicle and selected from a group consisting of the radar sensor and the LiDAR sensor, and configured to obtain side detection data; and a controller including a processor configured to process at least one of the front image data, the front detection data, and the side detection data.

17 Claims, 12 Drawing Sheets

DRIVER ASSISTANCE SYSTEM

CROSS-REFERENCE TO RELATED APPLICATION(S)

This application is based on and claims priority under 35 U.S.C. § 119 to Korean Patent Application No. 10-2020-0041009, filed on Apr. 3, 2020, the disclosure of which is incorporated herein by reference.

BACKGROUND

1. Field

The disclosure relates to a driver assistance apparatus, and more particularly, to the driver assistance apparatus capable of performing lane change by grasping a steering intent of a driver.

2. Description of Related Art

Recently, there have been development on various types of advanced driver assistance system (ADAS) that are designed to inform a driver of driving information of a vehicle to prevent an accident from occurring due to driver's carelessness and perform autonomous driving for driver's convenience.

In general, a DAS is implemented through various sensors mounted on the vehicle, but does not sufficiently reflect the driver's intent to operate, and there is a limit to safe autonomous lane change due to various unexpected traffic conditions.

SUMMARY

An aspect of the disclosure is to provide a driver assistance system that identifies a steering intent of a driver through on/off of a turn signal lamp and controls lane change applicable to various situations.

Additional aspects of the disclosure will be set forth in part in the description which follows and, in part, will be obvious from the description, or may be learned by practice of the disclosure.

In accordance with an aspect of the disclosure, a driver assistance system includes a first sensor installed in a vehicle to have a front view of a vehicle, and configured to obtain front image data; a second sensor installed in the vehicle to have a front detection field of view of the vehicle and selected from a group consisting of a radar sensor and a LiDAR sensor, and configured to obtain front detection data; a third sensor installed in the vehicle to have a side detection field of view of the vehicle and selected from a group consisting of the radar sensor and the LiDAR sensor, and configured to obtain side detection data; and a controller including a processor configured to process at least one of the front image data, the front detection data, and the side detection data. The controller may be configured to: detect on/off of a turn signal lamp of the vehicle; in response to the turn signal lamp being turned on, in response to processing at least one of the front image data, the front detection data, and the side detection data, detect a side object located on a side of the vehicle; and output a steering signal of a steering device of the vehicle or a warning signal of the vehicle based on the detection of the side object.

Based on the side object being detected, the controller may be configured to output the warning signal of the vehicle.

Based on the side object not being detected, the controller may be configured to output the steering signal of the steering device.

The driver assistance system may further include a fourth sensor installed in the vehicle to have a rear view of a vehicle, and configured to obtain rear image data; and a fifth sensor installed in the vehicle to have a rear detection field of view of the vehicle and selected from the group consisting of the radar sensor and the LiDAR sensor, configured to obtain rear detection data. The controller may be configured to: in response to processing at least one of the side detection data, the rear image data, and the rear detection data, detect a rear side object located at a rear side of the vehicle; and output the steering signal of the steering device of the vehicle or the warning signal of the vehicle based on the detection of the rear side object.

Based on the rear side object being detected, the controller may be configured to output the warning signal of the vehicle.

The controller may be configured to: in response to processing at least one of the side detection data, the front image data, and the front detection data, detect a front side object located on the front side of the vehicle; and in response to the front side object and the rear side object not being detected, output the steering signal of the steering device.

The controller may be configured to: calculate a relative speed of the vehicle based on the rear side object; and in response to the relative speed being less than a predetermined value, output the warning signal of the vehicle.

The controller may be configured to: calculate a relative speed of the vehicle based on the rear side object; and in response to the relative speed being greater than or equal to a predetermined value, output the steering signal of the steering device.

The controller may be configured to: detect a front object located in front of the vehicle and a front side object located on a front side of the vehicle; and in response to the front object being not detected and the front side object being detected, select the front side object as an adaptive cruise control (ACC) control target.

The controller may be configured to: detect a front object located in front of the vehicle and a front side object located on a front side of the vehicle; in response to the detection of the front object and the front side object, calculate a relative speed of the vehicle with respect to the front object and a relative speed of the vehicle with respect to the front side object; and in response to the relative speed of the vehicle with respect to the front side object being greater than the relative speed of the vehicle with respect to the front object, select the front side object as an ACC control target.

The controller may be configured to control an acceleration or speed of the vehicle to maintain a certain distance between the vehicle and the front side object.

The controller may be configured to: detect a front object located in front of the vehicle and a front side object located on a front side of the vehicle; in response to the detection of the front object and the front side object, calculate a relative speed of the vehicle with respect to the front object and a relative speed of the vehicle with respect to the front side object; and in response to the relative speed of the vehicle with respect to the front side object being less than the relative speed of the vehicle with respect to the front object, select the front side object as an ACC control target.

The controller may be configured to: compare a distance between the front object from the vehicle and a distance between the front side object from the vehicle; and in response to the distance between the front objects being less than the distance between the front side objects, control the acceleration of the vehicle so that the distance between the front objects is reduced.

In response to the reduction of the distance between the front objects, the controller may be configured to output a steering signal of the steering device of the vehicle.

The controller may be configured to: in response to the reduction of the distance between the front objects, detect a rear side object located on a rear side of the vehicle; and in response to the rear side object being not detected, output the steering signal of the steering device.

The controller may be configured to: in response to the reduction of the distance between the front objects, detect a rear side object located on a rear side of the vehicle; and in response to the rear side object being detected, output the warning signal of the vehicle.

The controller may be configured to: compare a distance between the front object from the vehicle and a distance between the front side object from the vehicle; and in response to the distance between the front objects being greater than the distance between the front side objects, output the warning signal of the vehicle.

The controller may be configured to: compare a distance between the front object from the vehicle and a distance between the front side object from the vehicle; in response to the distance between the front objects being greater than the distance between the front side objects, detect a rear side object located on a rear side of the vehicle; and in response to the detection of the rear side object, output the warning signal of the vehicle.

In accordance with another aspect of the disclosure, a driver assistance method includes obtaining, by a first sensor, front image data for a front view of a vehicle; obtaining, by a second sensor, front detection data for a front detection field of view of the vehicle; obtaining, by a third sensor, side detection data for a side detection field of view of the vehicle; detecting, by a controller, on/off of a turn signal lamp of the vehicle; in response to the turn signal lamp being turned on, in response to processing at least one of the front image data, the front detection data, and the side detection data, detecting, by the controller, a side object located on a side of the vehicle; and outputting, by the controller, a steering signal of a steering device of the vehicle or a warning signal of the vehicle based on the detection of the side object.

In accordance with another aspect of the disclosure, a non-transitory computer readable medium containing program instructions executed by a processor, the computer readable medium includes program instructions that obtain, by a first sensor, front image data for a front view of a vehicle; program instructions that obtain, by a second sensor, front detection data for a front detection field of view of the vehicle; program instructions that obtain, by a third sensor, side detection data for a side detection field of view of the vehicle; program instructions that detect, by a controller, on/off of a turn signal lamp of the vehicle; in response to the turn signal lamp being turned on, in response to processing at least one of the front image data, the front detection data, and the side detection data, program instructions that detect, by the controller, a side object located on a side of the vehicle; and program instructions that output, by the controller, a steering signal of a steering device of the vehicle or a warning signal of the vehicle based on the detection of the side object.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
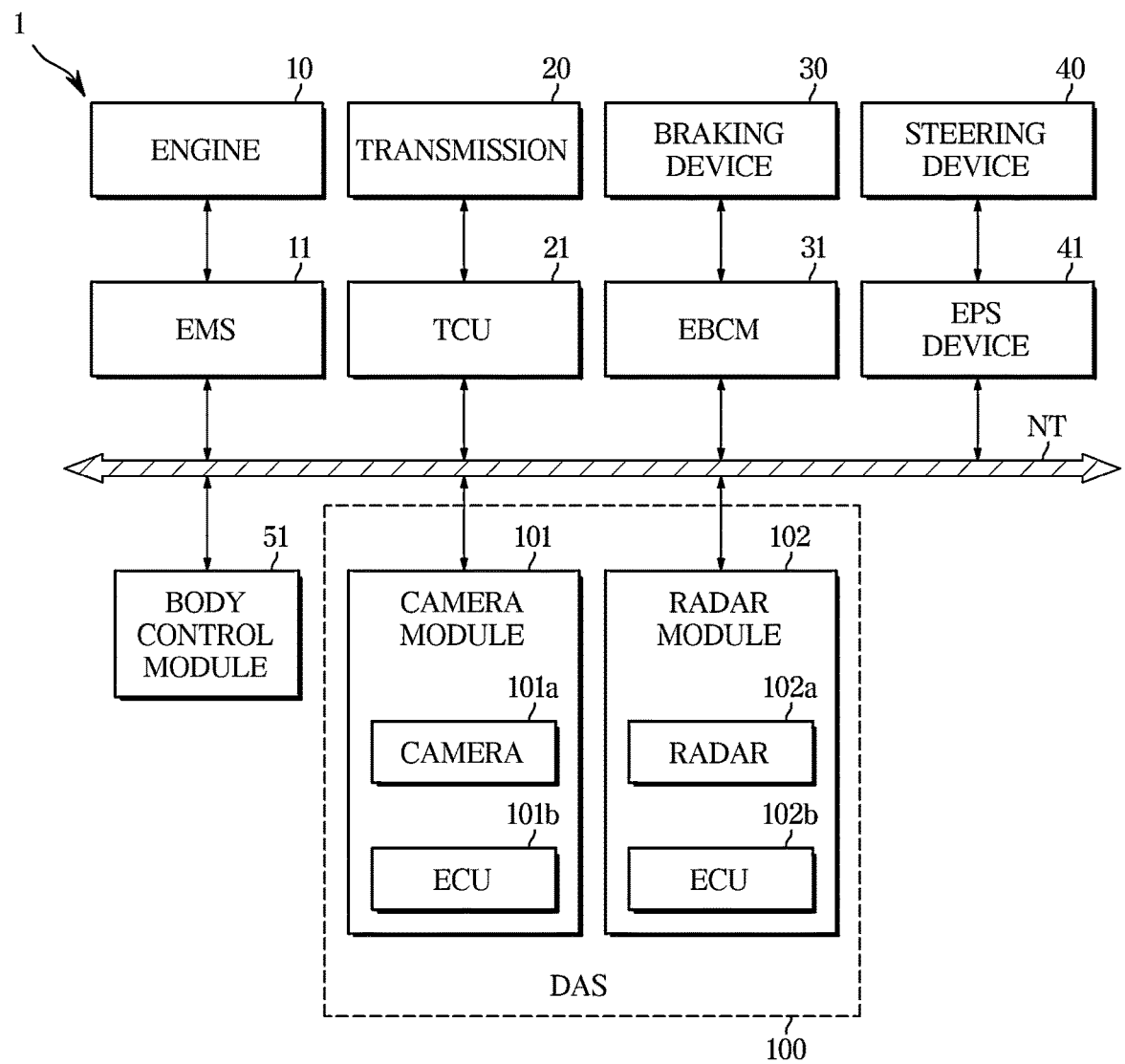
FIG. 1 is a block diagram illustrating components of a vehicle according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Throughout the specification, when a member is located "on" another member, this includes not only when one member is in contact with another member but also when another member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, operation principles and embodiments of the disclosure will be described with reference to accompanying drawings.

FIG. 1 is a block diagram illustrating components of a vehicle according to an embodiment.

As illustrated in FIG. 1, a vehicle 1 may include an engine 10, a transmission 20, a braking device 30, and a steering device 40. The engine 10 may include at least one cylinder and at least one piston, and may generate power needed to drive the vehicle 1. The transmission 20 may include a plurality of gears, and may transmit power generated by the engine 10 to wheels of the vehicle 1. The braking device 30 may decelerate or stop the vehicle 1 through frictional force on wheels. The braking device 30 may include one or more brake pads and brake shoes operative to decelerate or stop the vehicle. The steering device 40 may change a driving direction of the vehicle 1.

The vehicle 1 may include a plurality of electronic constituent elements. For example, the vehicle 1 may further include an Engine Management System (EMS) 11, a Transmission Controller also referred to as a Transmission Control Unit (TCU) 21, an Electronic Brake Controller also referred to as an Electronic Brake Control Module (EBCM) 31, an Electronic Power Steering (EPS) device 41, a Body Control Module (BCM), and a driver assistance system (DAS) 100.

The EMS 11 may control the engine 10 in response to either the driver's acceleration intention from the acceleration pedal or a request signal from the DAS 100. For example, the EMS 11 may control torque of the engine 10.

The TCU 21 may control the transmission 20 in response to either a driver's gearshift command activated by a gearshift lever and/or a driving speed of the vehicle 1. For example, the TCU 21 may adjust or regulate a gearshift ratio from the engine 10 to wheels of the vehicle 1.

The EBCM 31 may control a braking device 30 in response to either the driver's brake intention from a brake pedal or slippage of wheels. For example, the EBCM 31 may temporarily release wheel braking in response to wheel slippage detected in a braking mode of the vehicle 1, resulting in implementation of an Anti-lock Braking System (ABS). The EBCM 31 may selectively release braking of wheels in response to oversteering and/or understeering detected in a steering mode of the vehicle 1, resulting in implantation of Electronic Stability Control (ESC). In addition, the EBCM 31 may temporarily brake wheels in response to wheel slippage detected by vehicle driving, resulting in implementation of a Traction Control System (TCS).

The EPS device 41 may assist the steering device 40 in response to the driver's steering intention from the steering wheel, such that the EPS device 41 may assist the driver in easily handling the steering wheel. For example, the EPS device 41 may assist the steering wheel 40 in a manner that steering force decreases in a low-speed driving mode or a parking mode of the vehicle 1 but increases in a high-speed driving mode of the vehicle 1.

A body control module 51 may control various electronic components that are capable of providing the driver with user convenience or guaranteeing driver safety. For example, the body control module 51 may control headlamps (headlights), wipers, an instrument or other cluster, a multifunctional switch, turn signal indicators, or the like.

The DAS 100 may assist the driver in easily handling (e.g., driving, braking, and steering) the vehicle 1. For example, the DAS 100 may detect peripheral environments (e.g., a peripheral vehicle, pedestrian, cyclist, lane, traffic sign, or the like) of the vehicle 1 (i.e., vehicle itself), and may perform driving, braking, and/or steering of the vehicle 1 in response to the detected peripheral environments.

The DAS 100 may provide the driver with various functions. For example, the DAS 100 may provide the driver with a Lane Departure Warning (LDW) function, a Lane Keeping Assist (LKA) function, a High Beam Assist (HBA) function, an Autonomous Emergency Braking (AEB) function, a Traffic Sign Recognition (TSR) function, a Smart Cruise Control (SCC) function, a Blind Spot Detection (BSD) function, or the like.

The DAS 100 may include a camera module 101 operative to obtain image data of a peripheral area of the vehicle 1 (e.g., an area outside of and surrounding the vehicle 1), and a radar module 102 operative to obtain data about a peripheral object present in the peripheral area of the vehicle 1. The camera module 101 may include a camera 101a or multiple cameras and an Electronic Control Unit (ECU) 101b. The camera 101a may capture an image including a forward area of the vehicle 1 (e.g., an area in front of the vehicle 1), and may include an image processor operative to process the captured image to recognize peripheral vehicles, pedestrians, cyclists, lanes, traffic signs, or the like in the captured image. The radar module 102 may include a radar 102a or multiple radars and an ECU 102b, and may obtain or determine a relative position, a relative speed, or the like of the peripheral object (e.g., a peripheral vehicle, a pedestrian, or a cyclist) of the vehicle 1 based on detected radar data.

The DAS 100 is not limited to the components illustrated in FIG. 1, and may further include a Light Detection And Ranging (LiDAR) that scans around the vehicle 1 and detects the object.

The above-mentioned electronic components may communicate with each other through a vehicle communication network (NT). For example, the electronic components may perform data communication through Ethernet, Media Oriented Systems Transport (MOST), a FlexRay, a Controller Area Network (CAN), a Local Interconnect Network (LIN), or the like. For example, the DAS 100 may respectively transmit a drive control signal, a brake signal, and a steering signal to the EMS 11, the EBCM 31, and the EPS device 41 over the vehicle communication network (NT).

Figure 2:
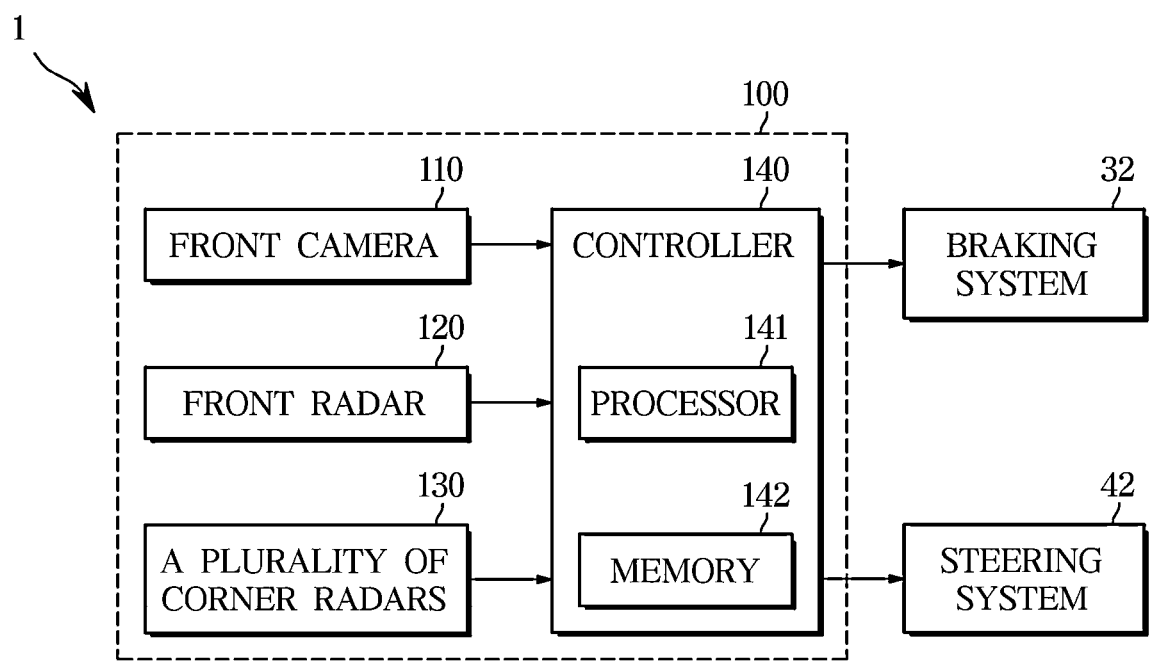
FIG. 2 is a block diagram illustrating a driver assistance system (DAS) according to an embodiment.
Figure 3:
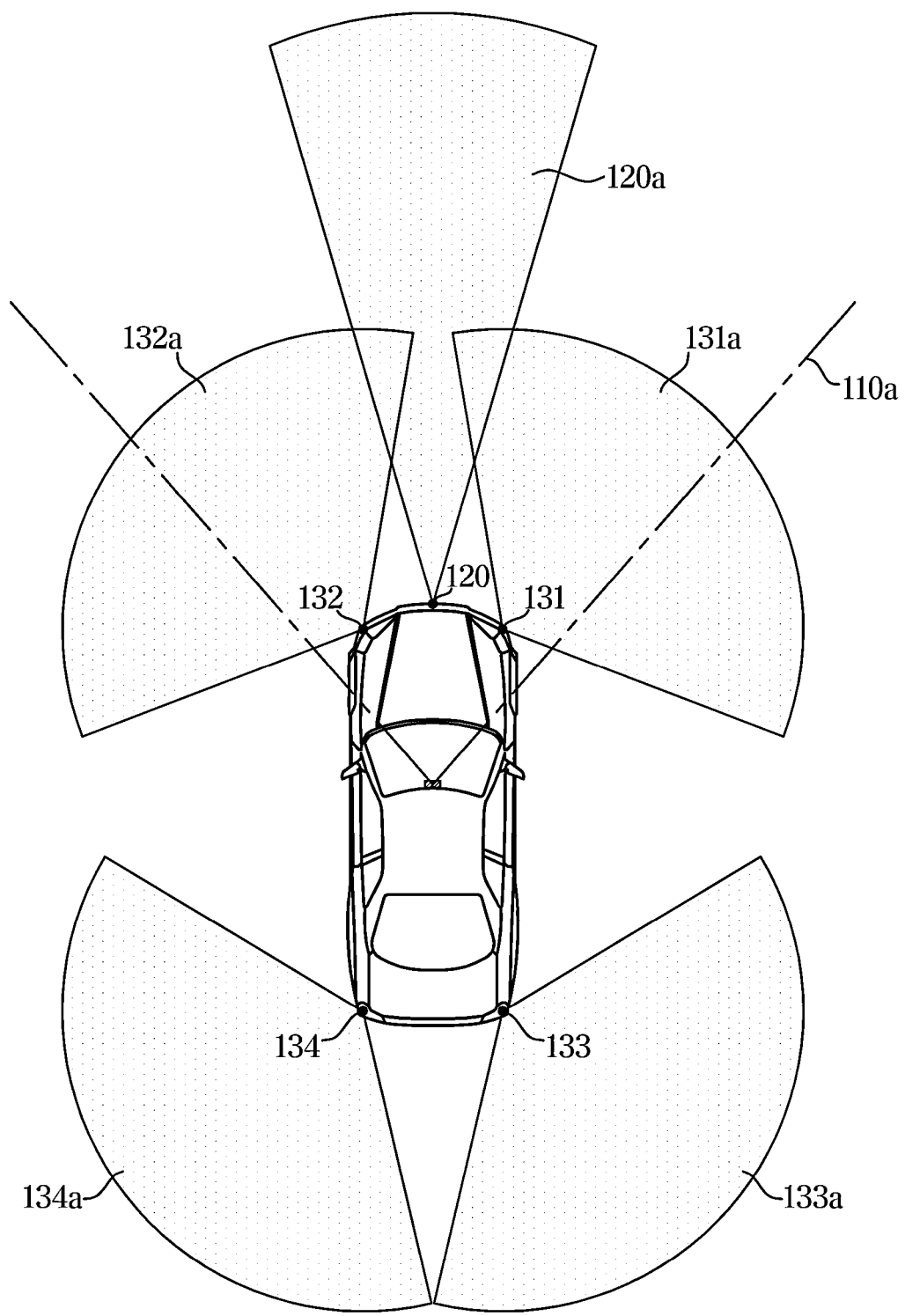
FIG. 3 is a view illustrating a camera and a radar included in a DAS according to an embodiment.

FIG. 2 is a block diagram illustrating a driver assistance system (DAS) according to an embodiment, and FIG. 3 is a view illustrating a camera and a radar included in a DAS according to an embodiment.

Referring to FIG. 2, the vehicle 1 may include a braking system 32, a steering system 42, and the DAS 100.

The braking system 32 according to the embodiment may include the EBCM 31 (see FIG. 1) and the braking device 30 (see FIG. 1) described in conjunction with FIG. 1, and the steering system 42 may include the EPS 41 (see FIG. 1) and the steering device 40 (see FIG. 1).

The DAS 100 may include a front camera 110 a front radar 120, and a plurality of corner radars 130.

The front camera 110 may have a field of view 110a directed to the front of the vehicle 1 as illustrated in FIG. 3. For example, the front camera 110 may be installed on a front windshield of the vehicle 1.

The front camera 110 may image the front of the vehicle 1 and acquire image data regarding the front of the vehicle 1. The image data regarding the front of the vehicle 1 may include a position of at least one of another vehicle, a pedestrian, a cyclist, a lane, or the like existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a controller 140. For example, the front camera 110 may be connected to the controller 140 through a vehicle communication network NT, through a hard wire, or through a printed circuit board (PCB).

The front camera 110 may transmit the image data of the front of the vehicle 1 to the controller 140.

The front radar 120 may have a field of sensing 120a directed to the front of the vehicle 1 as illustrated in FIG. 3. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an object. The front radar 120 may obtain front radar data from the transmission radio waves transmitted by the transmission antenna and the reflection radio waves received by the reception antenna. Front radar data may include distance information and speed information regarding the object, such as another vehicle, the pedestrian, or the cyclist existing in front of the vehicle 1. The front radar 120 may calculate the relative distance to the object based on the phase difference (or time difference) between the transmission radio waves and the reflection radio waves, and calculate the relative speed of the object based on the frequency difference between the transmission radio waves and the reflected radio waves.

The front radar 120 may be connected to the controller 140 through the vehicle communication network NT, the hard wire, or the PCB. The front radar 120 may transmit the front radar data to the controller 140.

The plurality of corner radars 130 may include a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1 as illustrated in FIG. 3. The first corner radar 131 may be installed on the right side of a front bumper of the vehicle 1. The second corner radar 132 may have a field of sensing 132a directed to the front left side of the vehicle 1, and may be installed on the left side of the front bumper of the vehicle 1. The third corner radar 133 may have a field of sensing 133a directed to the rear right side of the vehicle 1 and may be installed on the right side of a rear bumper of the vehicle 1. The fourth corner radar 134 may have a field of sensing 134a directed to the rear left side of the vehicle 1 and may be installed on the left side of the rear bumper of the vehicle 1.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and speed information regarding another vehicle, the pedestrian or the cyclist (hereinafter, referred to as the object) existing on the front right side of the vehicle 1.

The second corner radar data may include distance information and speed information regarding the object existing on the front left side of the vehicle 1.

The third and fourth corner radar data may respectively include distance and speed information regarding the object existing on the rear right side of the vehicle 1 and distance and speed information regarding the object located on the rear left side of the vehicle 1, respectively.

Each of the first, second, third, and fourth corner radars 131, 132, 133 and 134 may be connected to the controller 140, for example, through the vehicle communication network NT, the hard wire, or the PCB. The first, second, third, and fourth corner radars 131, 132, 133, and 134 may respectively transmit the first corner radar data, the second corner radar data, the third corner radar data, and the fourth corner radar data to the controller 140.

The controller 140 may include the ECU 101b (see FIG. 1) of the camera module 101 (see FIG. 1) and/or the ECU 102b (see FIG. 1) of the radar module 102 (see FIG. 1), and/or an integrated ECU.

The controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42. For example, the processor 141 may include an image signal processor for processing the front image data of the front camera 110 and/or a digital signal processor for processing radar data of the radars 120 and 130 and/or a micro control unit (MCU) for generating a braking signal and/or a steering signal.

The processor 141 may detect objects (e.g., another vehicle, the pedestrian, the cyclist, and the like) in front of the vehicle 1 based on the front image data of the front camera 110 and the front radar data of the radar 120.

In detail, the processor 141 may obtain the position (distance and direction) and the relative speed of the objects in front of the vehicle 1 based on the front radar data of the front radar 120. The processor 141 may obtain the position (direction) and type information (for example, whether the object is another vehicle, the pedestrian, the cyclist, or the like) of the object existing in front of the vehicle 1 based on the front image data of the front camera 110. In addition, the processor 141 may match the objects detected by the front image data with the objects detected by the front radar data, and obtain the position (distance and direction) and the relative speed of the objects in front of the vehicle 1 based on a result of the matching.

The processor 141 may generate the braking signal and a steering signal based on the type information, the position, and the relative speed of the front objects.

For example, the processor 141 calculates a time to collision (TTC) between the vehicle 1 and the front object based on the position (distance) and the relative speed of the front objects, and warns the driver of a collision, transmits the braking signal to the braking system 32, or transmits the steering signal to the steering system 42 based on a result of comparing the TTC with a predetermined reference time. In response to the TTC less than a predetermined first reference time, the processor 141 may allow an alert to be output via audio and/or display. In response to the TTC less than a predetermined second reference time, the processor 141 may transmit a preliminary-braking signal to the braking system 32. In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) based on the relative speed of front objects, and warn the driver of a collision or transmit the braking signal to the braking system 32 based on a result of comparing the DTC with distances to the front objects.

The processor 141 may obtain the position (distance and direction) and the relative speed of the objects on the sides of the vehicle 1 (front right, front left, rear right, and rear left) based on corner radar data of the plurality of corner radars 130.

The processor 141 may transmit the steering signal to the steering system 42 based on the position (distance and direction) and the relative speed of side objects of the vehicle 1.

For example, when the collision with the front object is determined based on TTC or DTC, the processor 141 may transmit the steering signal to the steering system 42 to avoid collision with the front object.

The processor 141 may determine whether to avoid the collision with the front object by changing the driving direction of the vehicle 1 based on the position (distance and direction) and relative speed of the side objects of the vehicle 1. For example, when there is no the object located on the side of the vehicle 1, the processor 141 may transmit the steering signal to the steering system 42 in order to avoid the collision with the front object. When the collision with the side object is not predicted after the steering of the vehicle 1 based on the position (distance and direction) of the side objects and the relative speed, the processor 141 may transmit the steering signal to the steering system 42 in order to avoid the collision with the front object. When the collision with the side object is predicted after the steering of the vehicle 1 based on the position (distance and direction) of the side objects and the relative speed, the processor 141 may not transmit the steering signal to the steering system 42.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

The DAS 100 is not limited to the components illustrated in FIG. 2, and may further include the LiDAR that scans around the vehicle 1 and detects the object.

As such, the controller 140 may transmit the braking signal to the braking system 32 based on whether the collision with the front object is predicted. When the side object does not exist or the collision with the side object is not predicted, the controller 140 may transmit the steering signal to the steering system 42 to avoid collision with the front object. When the collision with the side object is predicted after steering, the controller 140 may not transmit the steering signal to the steering system 42.

Meanwhile, before describing various embodiments described below, data processed by the controller 140 and a subject of obtaining the data will be described.

The vehicle 1 may include a front image sensor having a front field of view of the vehicle 1 and obtaining front image data, a front non-image sensor that has a front detection field of view of the vehicle 1 and is selected from the group consisting of a radar sensor and a LiDAR sensor, and obtains front detection data, a side non-image sensor that has a side detection field of view of the vehicle 1 and is selected from a group consisting of the radar sensor and the LiDAR sensor to obtain side detection data, a rear image sensor that has a rear field of view of the vehicle 1 and acquires rear image data, and a rear non-image sensor that has a rear detection field of view of the vehicle 1 and is selected from a group consisting of the radar sensor and the LiDAR sensor to obtain rear detection data.

The front image sensor and the front non-image sensor may detect a front object located in front of the vehicle 1.

The side non-image sensor may detect a side object, a front side object, and a rear side object located in the side, front side and rear side of the vehicle 1. The side non-image sensor is installed at a corner position of the vehicle 1 and can detect side objects, anterior objects, and rear objects located in the side, front and rear sides alone, and may be installed on the side of the vehicle 1, together with the front image sensor, the front non-image sensor, the rear image sensor and the rear non-image sensor and detects side objects, anterior and posterior objects located in the anterior and posterior areas.

The rear image sensor and the rear non-image sensor may detect a rear object located at the rear of the vehicle 1.

In addition, the disclosure is carried out based on the on/off of the turn indicator lamp of the vehicle 1 when an adaptive cruise control (ACC) is activated. For example, when the direction indicator lamp of the vehicle 1 is turned on, the controller 140 may determine that the driver is willing to change lanes, and a control algorithm to be described later may be executed. For example, when the left side of the direction indicator lamp is turned on, the controller 140 predicts that the driver will attempt to change lanes to the left lane, and performs control based on the activation of the non-image sensor on the left. Conversely, when the right side of the direction indicator lamp is turned on, the controller 140 predicts that the driver will attempt to change the lane to the right lane, and performs control based on the activation of the non-image sensor on the right.

Figure 4:
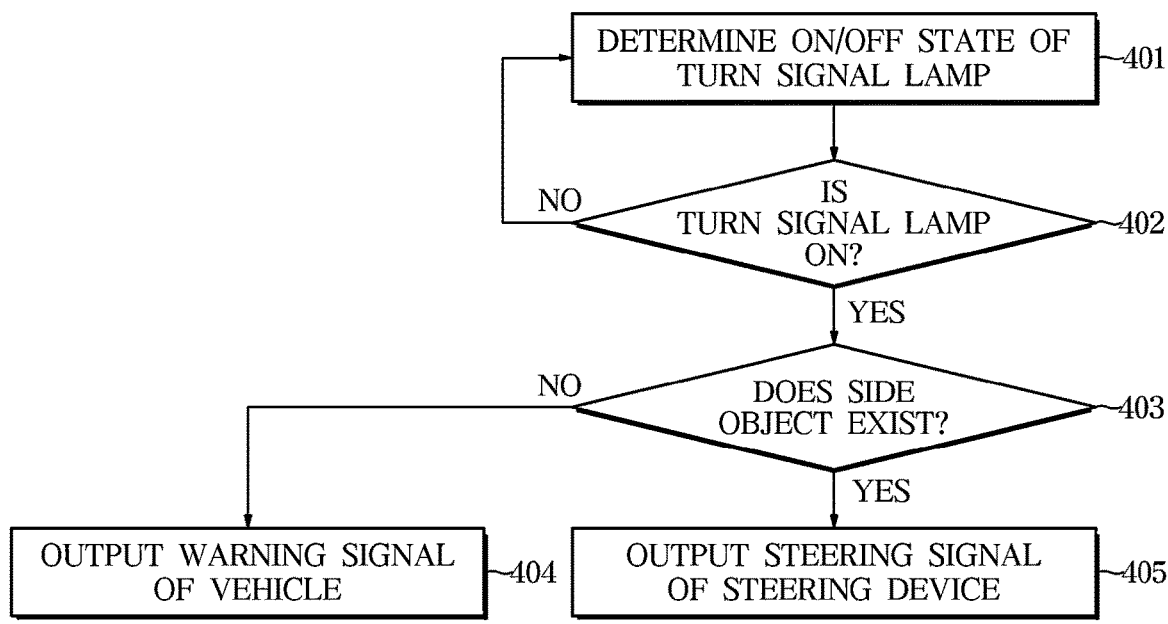
FIG. 4 is a flowchart of a driver assistance method according to an embodiment.

FIG. 4 is a flowchart of a driver assistance method according to an embodiment. However, this is only a preferred embodiment for achieving the purpose of the disclosure, and of course, some operations may be added or deleted as necessary. FIG. 4 will be described with reference to FIG. 5.

The controller 140 may determine an on/off state of a turn signal lamp of the vehicle 1 (401). When the turn signal lamp is on (402), the controller 140 may determine whether a side object 2 exists on the side of the vehicle 1 (403).

Figure 5:
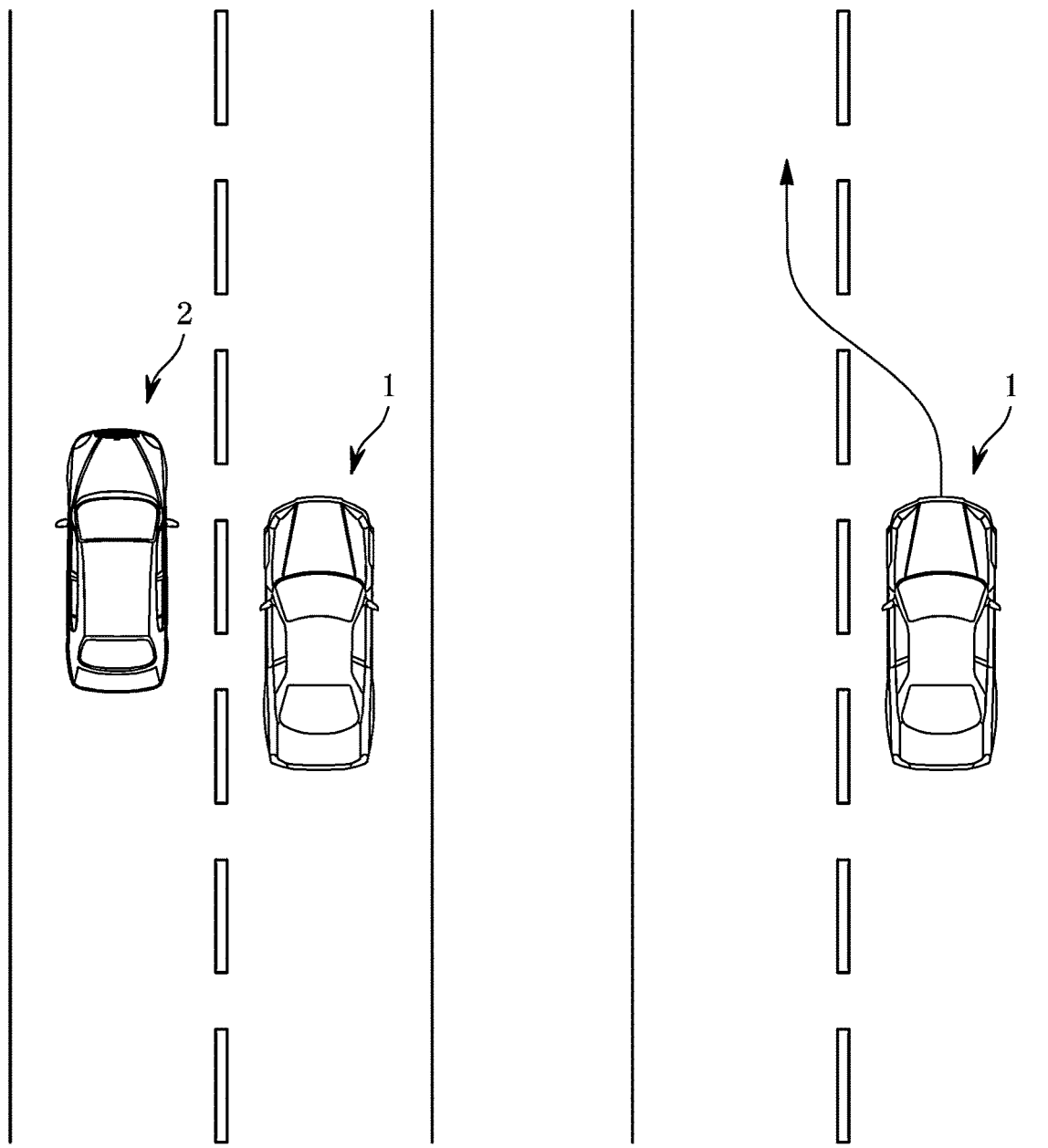
FIG. 5 is a view illustrating an example of a driving situation according to FIG. 4.

As illustrated on a left side of FIG. 5, the controller 140 may output a warning signal of the vehicle 1 when the side object 2 exists on the side of the vehicle 1 (404).

In this case, the warning signal may correspond to a control signal for notifying the driver of a collision risk by a display or an audio provided in the vehicle 1.

As illustrated on a right side of FIG. 5, when the side object 2 does not exist on the side of the vehicle 1, the controller 140 may output the steering signal of the steering device 40 (405), and the vehicle 1 may perform the lane change.

Figure 6:
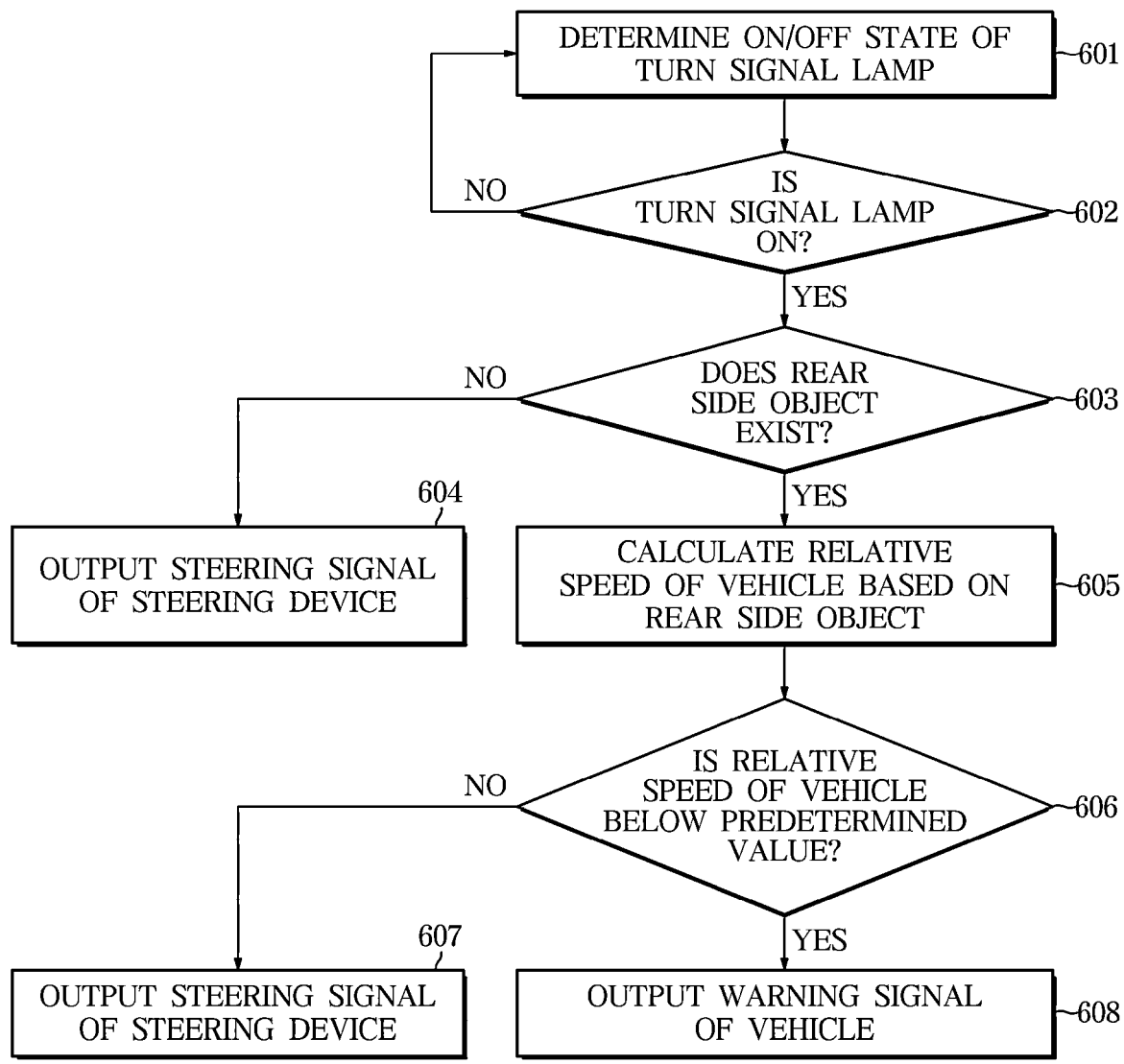
FIG. 6 is a flowchart of a driver assistance method according to an embodiment.
Figure 7:
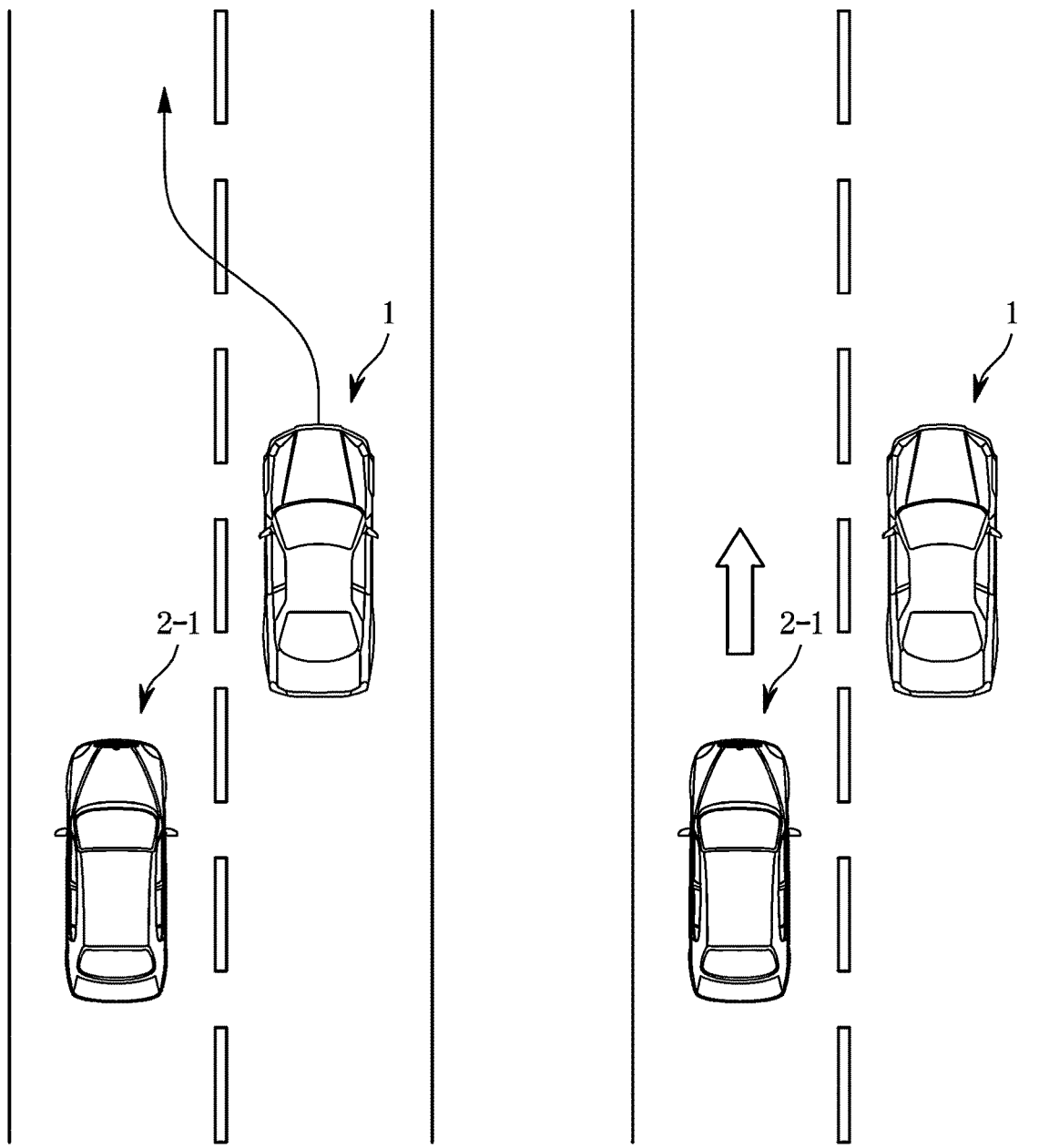
FIG. 7 is a view illustrating an example of a driving situation according to FIG. 6.

FIG. 6 is a flowchart of a driver assistance method according to an embodiment. However, this is only a preferred embodiment for achieving the purpose of the disclosure, and of course, some operations may be added or deleted as necessary. FIG. 6 will be described with reference to FIG. 7.

The controller 140 may determine the on/off state of the turn signal lamp of the vehicle 1 (601). When the turn signal lamp is on (602), the controller 140 may determine whether a rear side object 2-1 exists on the rear side of the vehicle 1 (603).

When the rear side object 2-1 is not detected, the controller 140 may output the steering signal of the steering device 40 of the vehicle 1 (604). In addition, the controller 140 may output the steering signal of the steering device 40 when the front side object is not detected in addition to the rear side object 2-1.

When the rear side object 2-1 is detected, the controller 140 may determine whether the relative speed of the vehicle 1 is less than a predetermined value (606). Here, the relative speed is a value obtained by subtracting the speed of the rear side object 2-1 from the speed of the vehicle 1. Therefore, when the relative speed is less than the predetermined value, the controller 140 may determine that there is a possibility that the rear side object 2-1 approaches the vehicle 1. When the relative speed is more than the predetermined value, the controller 140 may determine that there is no possibility that the rear side object 2-1 approaches the vehicle 1.

When the relative speed is less than the predetermined value, the controller 140 may determine that there is a possibility that the rear side object 2-1 approaches the vehicle 1 and output the warning signal of the vehicle 1 (608).

When the relative speed is greater than or equal to the predetermined value, the controller 140 may determine that there is no possibility that the rear side object 2-1 approaches the vehicle 1 and output the steering signal of the steering device 40 (607).

Figure 8:
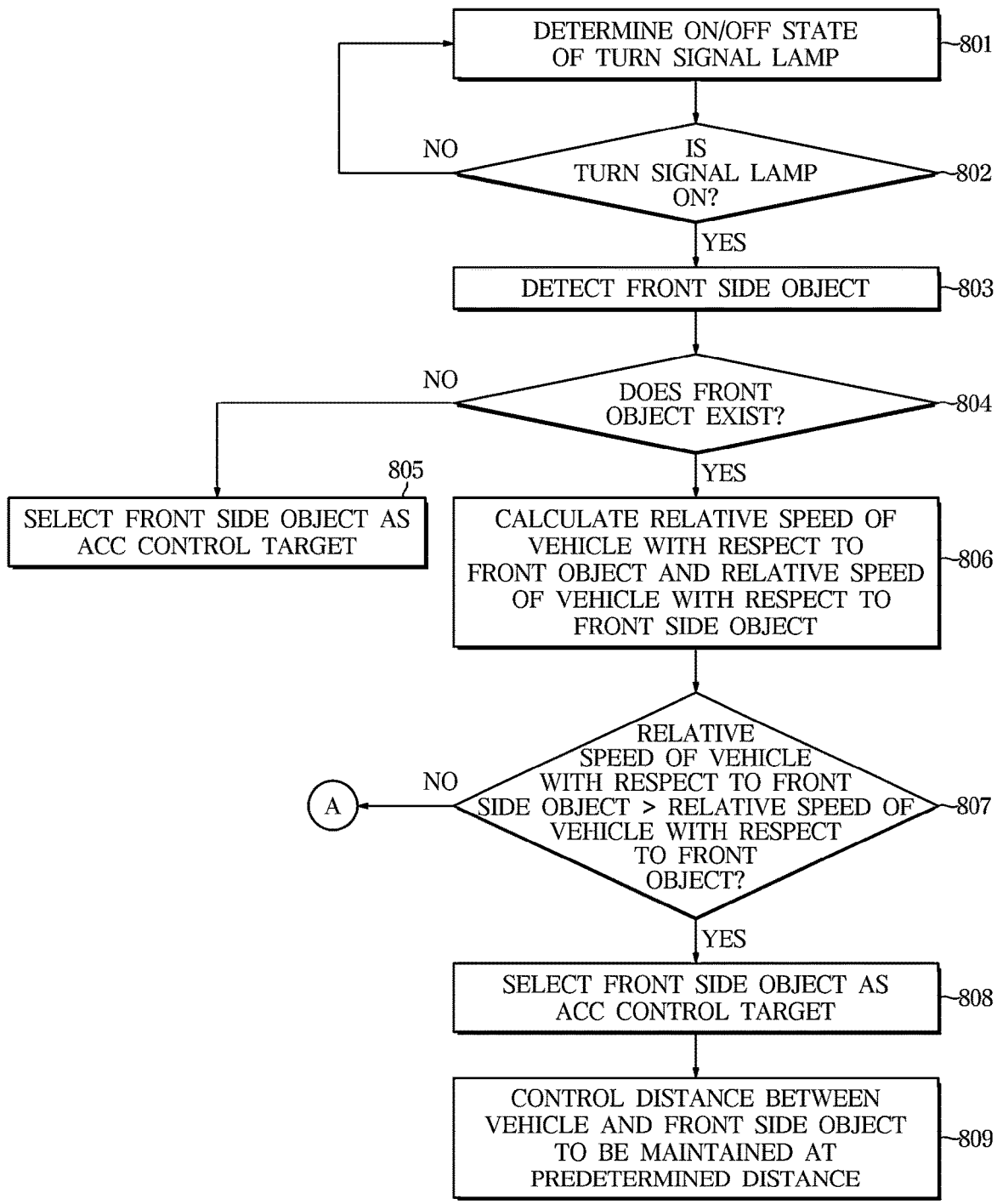
FIG. 8 is a flowchart of a driver assistance method according to an embodiment.
Figure 9:
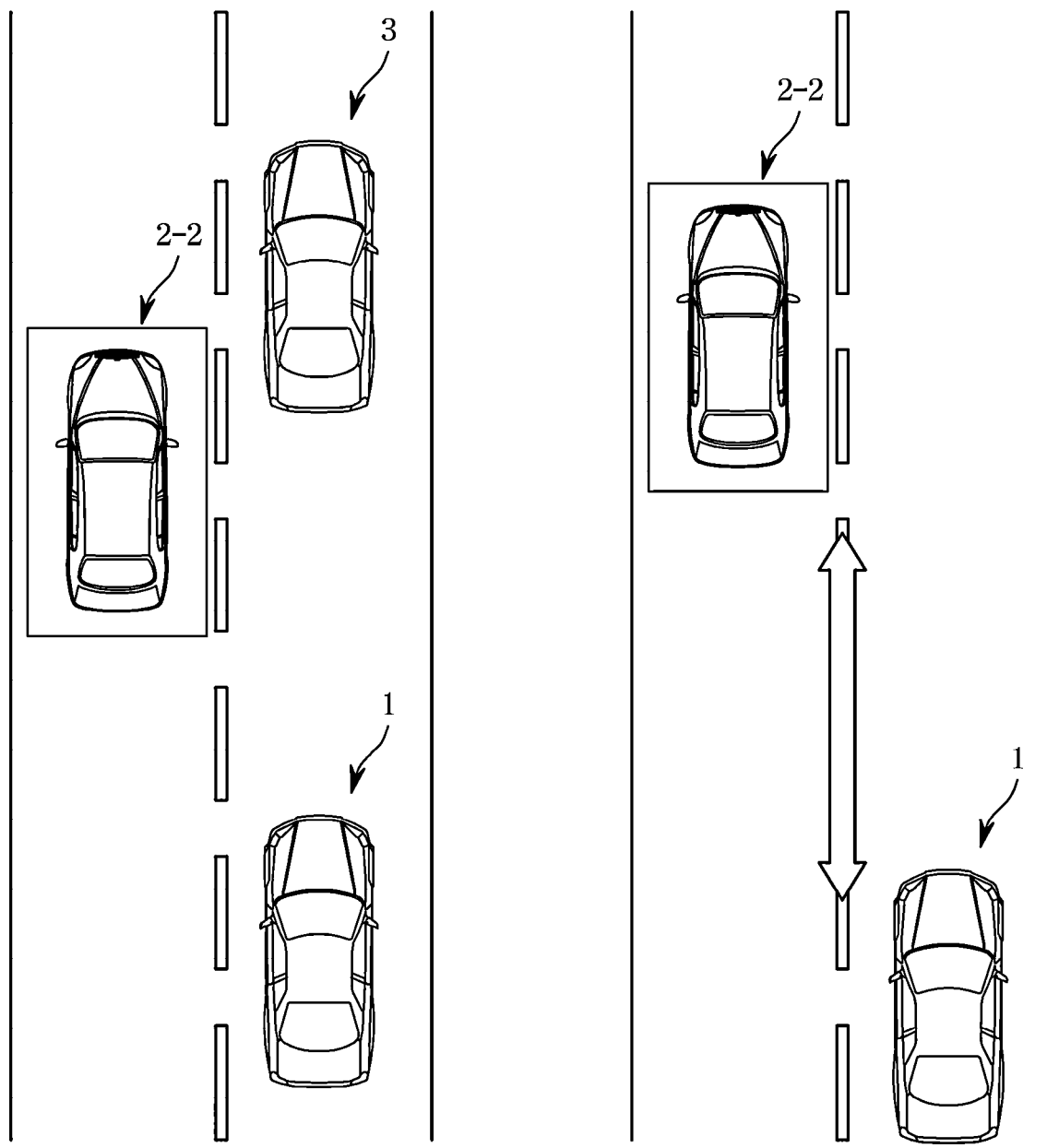
FIG. 9 is a view illustrating an example of a driving situation according to FIG. 8.

FIG. 8 is a flowchart of a driver assistance method according to an embodiment. However, this is only a preferred embodiment for achieving the purpose of the disclosure, and of course, some operations may be added or deleted as necessary. FIG. 8 will be described with reference to FIG. 9.

The controller 140 may determine the on/off state of the turn signal lamp of the vehicle 1 (801). When the turn signal lamp is on (802), the controller 140 may determine whether a front side object 2-2 exists on the front side of the vehicle 1 (803).

In addition to detecting the front side object 2-2, the controller 140 may determine whether a front object 3 exists in front (804). At this time, when it is determined that the front object 3 does not exist, the controller 140 may select only the front side object as an ACC control target (805), and may attempt to change lanes based only on the front side object 2-2.

When detecting the presence of the front side object 2-2 and the front object 3, the controller 140 may calculate the relative speed of the vehicle 1 with respect to the front object 3 and the relative speed of the vehicle 1 with respect to the front side object 2-2 (806).

When the relative speed of the vehicle 1 with respect to the front side object 2-2 is greater than the relative speed of the vehicle 1 with respect to the front object 3 (807), the controller 140 may select the front side object 2-2 as the ACC control target (808). In this case, since the vehicle 1 has a higher possibility of collision with the front side object 2-2 than the front object 3 when changing lanes, the selecting the ACC control target as the front side object 2-2 may be more efficient in determining the possibility of collision.

At this time, the controller 140 may control the distance between the vehicle 1 and the front side object 2-2 to be maintained at a predetermined distance (809). Particularly, the vehicle 1 may control an acceleration or speed of the vehicle 1 to maintain a certain distance. Accordingly, since the vehicle 1 is in a state in which the certain distance from the front side object 2-2 is maintained, the lane change may be performed immediately based on only the signal of the turn signal lamp.

Figure 11:
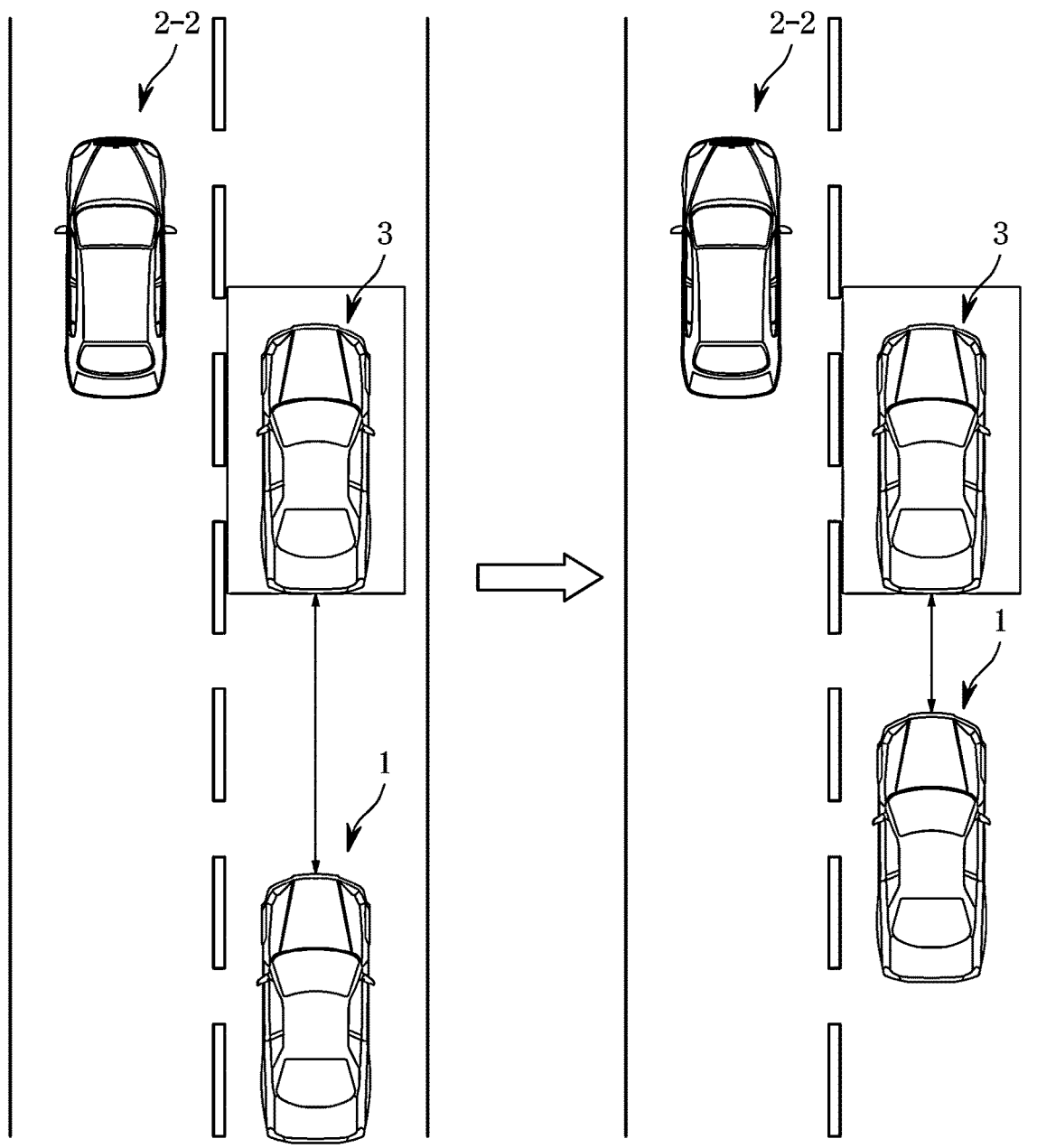
FIGS. 11 and 12 are views illustrating an example of a driving situation according to FIG. 10.
Figure 12:
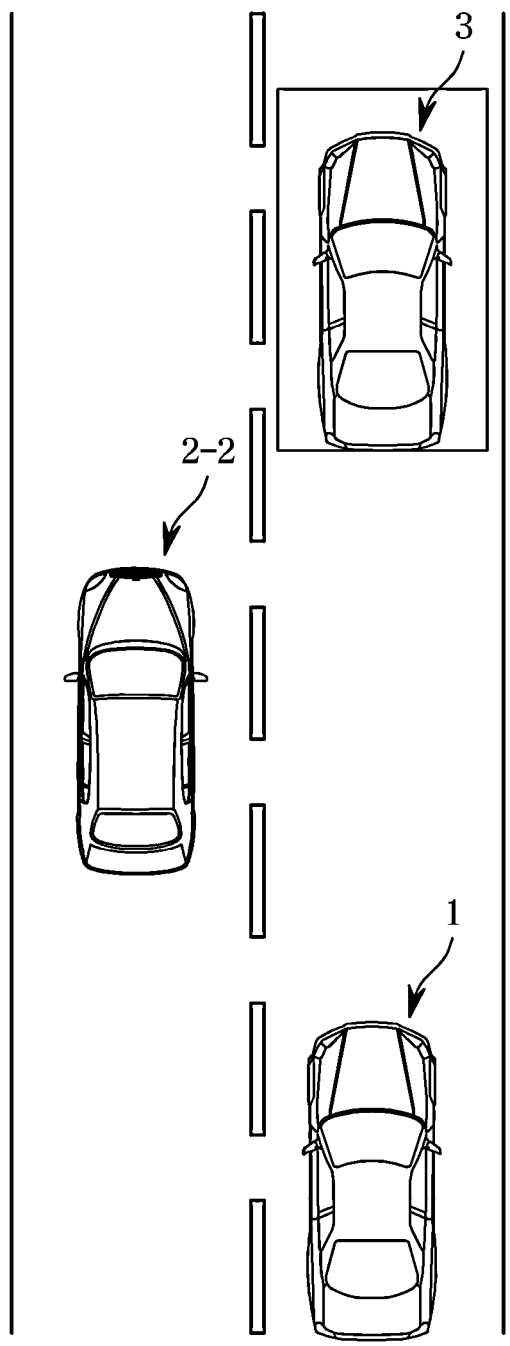

Meanwhile, in operation 807 of FIG. 8, a case where the relative speed of the vehicle 1 with respect to the front side object 2-2 is less than the relative speed of the vehicle 1 with respect to the front object 3 is omitted. This will be described in detail with reference to FIGS. 10 to 12.

Figure 10:
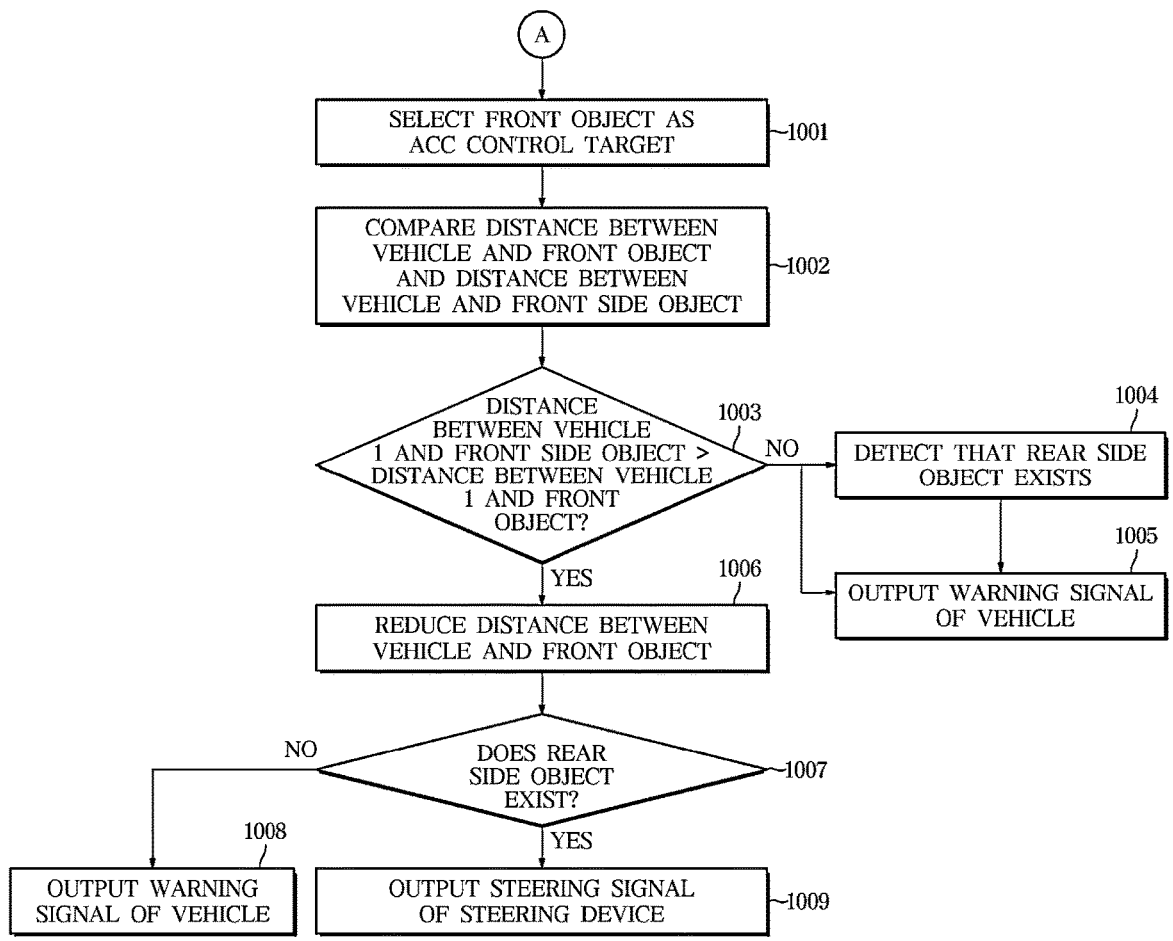
FIG. 10 is a flowchart of a driver assistance method according to an embodiment.

FIG. 10 is a flowchart of a driver assistance method according to an embodiment. However, this is only a preferred embodiment for achieving the purpose of the disclosure, and of course, some operations may be added or deleted as necessary. FIG. 10 will be described with reference to FIGS. 11 and 12.

When the relative speed of the vehicle 1 with respect to the front side object 2-2 is less than the relative speed of the vehicle 1 with respect to the front object 3, the controller 140 may determine that a possibility of approaching with the front object 3 is higher than that of the front side object 2-2.

Accordingly, the controller 140 may select the front object 3 as the ACC control target (1001).

The controller 140 may compare the distance between the vehicle 1 and the front object 3 and the distance between the vehicle 1 and the front side object 2-2 (1002).

When the distance between the vehicle 1 and the front side object 2-2 is greater than the distance between the vehicle 1 and the front object 3 (1003), the controller 140 may reduce the distance between the vehicle 1 and the front object 3 by controlling the acceleration of the vehicle 1 (1006). See FIG. 11.

In this case, due to the premise of operation 807 in FIG. 8, it can be seen that the front side object 2-2 is moving away from the vehicle 1, and the front object 3 is moving closer to the vehicle 1. Accordingly, since the vehicle 1 is in a state in which the certain distance from the front side object 2-2 is secured, the lane change may be performed immediately based on only the signal of the turn signal lamp. At this time, when the distance between the front objects 3 is reduced, the controller 140 may output the steering signal of the steering device 40 of the vehicle 1 (1009).

In addition to operations 1003 and 1006 described above, the controller 14 may determine whether the rear side object exists on the rear side of the vehicle 1 (1007).

At this time, the controller 140 may output the warning signal of the vehicle 1 when the rear side object exists (1008), and may output the steering signal of the steering device 40 when the rear side object does not exist.

In operation 1003, when the distance between the front objects 3 is greater than the distance between the front side objects 2-2, the controller 140 may output the warning signal of the vehicle 1 (1005). In addition, the controller 140 may output the warning signal of the vehicle 1 under an additional operation 1004 that the rear side object is detected on the rear side.

According to the embodiments of the disclosure, an autonomous driving system capable of performing a safe lane change of a vehicle may be implemented.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A driver assistance system comprising:
   a first sensor installed in a vehicle to have a front view of a vehicle, and configured to obtain front image data;
   a second sensor installed in the vehicle to have a front detection field of view of the vehicle and selected from a group consisting of a radar sensor and a LiDAR sensor, and configured to obtain front detection data;
   a third sensor installed in the vehicle to have a side detection field of view of the vehicle and selected from a group consisting of a radar sensor and a LiDAR sensor, and configured to obtain side detection data; and
   a controller including a processor configured to process at least one of the front image data, the front detection data, and the side detection data,
   wherein the controller is configured to:
   detect on/off of a turn signal lamp of the vehicle;
   in response to the turn signal lamp being turned on, in response to processing at least one of the front image data, the front detection data, and the side detection data, detect a side object located on a side of the vehicle; and
   output a steering signal of a steering device of the vehicle or a warning signal of the vehicle based on the detection of the side object, and
   wherein the controller is configured to:
   compare a distance between a front object, located in front of the vehicle, and the vehicle and a distance between the front side object, located on a front side of the vehicle, and the vehicle; and
   in response to a comparison result that the distance between the front object and the vehicle is less than the distance between the front side object and the vehicle, control an acceleration of the vehicle so that the distance between the front object and the vehicle is reduced.

2. The driver assistance system according to claim 1, wherein, based on the side object being detected, the controller is configured to output the warning signal of the vehicle.

3. The driver assistance system according to claim 1, wherein, based on the side object not being detected, the controller is configured to output the steering signal of the steering device.

4. The driver assistance system according to claim 1, further comprising:
   a fourth sensor installed in the vehicle to have a rear view of a vehicle, and configured to obtain rear image data; and
   a fifth sensor installed in the vehicle to have a rear detection field of view of the vehicle and selected from a group consisting of a radar sensor and a LiDAR sensor, configured to obtain rear detection data,
   wherein the controller is configured to:
   in response to processing at least one of the side detection data, the rear image data, and the rear detection data, detect a rear side object located at a rear side of the vehicle; and
   output the steering signal of the steering device of the vehicle or the warning signal of the vehicle based on the detection of the rear side object.

5. The driver assistance system according to claim 4, wherein, based on the rear side object being detected, the controller is configured to output the warning signal of the vehicle.

6. The driver assistance system according to claim 4, wherein the controller is configured to:
   in response to processing at least one of the side detection data, the front image data, and the front detection data, detect a front side object located on the front side of the vehicle; and
   in response to the front side object and the rear side object not being detected, output the steering signal of the steering device.

7. The driver assistance system according to claim 4, wherein the controller is configured to:
   calculate a relative speed of the vehicle based on the rear side object; and
   in response to the relative speed being less than a predetermined value, output the warning signal of the vehicle.

8. The driver assistance system according to claim 4, wherein the controller is configured to:
   calculate a relative speed of the vehicle based on the rear side object; and
   in response to the relative speed being greater than or equal to a predetermined value, output the steering signal of the steering device.

9. The driver assistance system according to claim 1, wherein the controller is configured to:
   detect a front object located in front of the vehicle and a front side object located on a front side of the vehicle; and
   in response to the front object being not detected and the front side object being detected, select the front side object as an adaptive cruise control (ACC) control target.

10. The driver assistance system according to claim 1, wherein the controller is configured to:
    detect a front object located in front of the vehicle and a front side object located on a front side of the vehicle;
    in response to the detection of the front object and the front side object, calculate a relative speed of the vehicle with respect to the front object and a relative speed of the vehicle with respect to the front side object; and in response to the relative speed of the vehicle with respect to the front side object being greater than the relative speed of the vehicle with respect to the front object, select the front side object as an ACC control target.

11. The driver assistance system according to claim 10, wherein the controller is configured to control an acceleration or speed of the vehicle to maintain a certain distance between the vehicle and the front side object.

12. The driver assistance system according to claim 1, wherein the controller is configured to:
detect the front object and the front side object;
in response to the detection of the front object and the front side object, calculate a relative speed of the vehicle with respect to the front object and a relative speed of the vehicle with respect to the front side object; and
in response to the relative speed of the vehicle with respect to the front side object being less than the relative speed of the vehicle with respect to the front object, select the front object as an ACC control target.

13. The driver assistance system according to claim 1, wherein, in response to the reduction of the distance between the front object and the vehicle, the controller is configured to output a steering signal of the steering device of the vehicle.

14. The driver assistance system according to claim 1, wherein the controller is configured to:
in response to the reduction of the distance between the front object and the vehicle, detect a rear side object located on a rear side of the vehicle; and
in response to the rear side object being not detected, output the steering signal of the steering device.

15. The driver assistance system according to claim 1, wherein the controller is configured to:
in response to the reduction of the distance between the front object and the vehicle, detect a rear side object located on a rear side of the vehicle; and
in response to the rear side object being detected, output the warning signal of the vehicle.

16. A driver assistance system comprising:
a first sensor installed in a vehicle to have a front view of a vehicle, and configured to obtain front image data;
a second sensor installed in the vehicle to have a front detection field of view of the vehicle and selected from a group consisting of a radar sensor and a LiDAR sensor, and configured to obtain front detection data;
a third sensor installed in the vehicle to have a side detection field of view of the vehicle and selected from a group consisting of the radar sensor and the LiDAR sensor, and configured to obtain side detection data; and
a controller including a processor configured to process at least one of the front image data, the front detection data, and the side detection data,
wherein the controller is configured to:
detect on/off of a turn signal lamp of the vehicle;
in response to the turn signal lamp being turned on, in response to processing at least one of the front image data, the front detection data, and the side detection data, detect a side object located on a side of the vehicle; and
output a steering signal of a steering device of the vehicle or a warning signal of the vehicle based on the detection of the side object, and
wherein the controller is configured to:
compare a distance between a front object, located in front of the vehicle, and the vehicle and a distance between a front side object, located on a front side of the vehicle, and the vehicle; and
in response to a comparison result the distance between the front object and the vehicle is greater than the distance between the front side object and the vehicle, output the warning signal of the vehicle.

17. A driver assistance system comprising:
a first sensor installed in a vehicle to have a front view of a vehicle, and configured to obtain front image data;
a second sensor installed in the vehicle to have a front detection field of view of the vehicle and selected from a group consisting of a radar sensor and a LiDAR sensor, and configured to obtain front detection data;
a third sensor installed in the vehicle to have a side detection field of view of the vehicle and selected from a group consisting of the radar sensor and the LiDAR sensor, and configured to obtain side detection data; and
a controller including a processor configured to process at least one of the front image data, the front detection data, and the side detection data,
wherein the controller is configured to:
detect on/off of a turn signal lamp of the vehicle;
in response to the turn signal lamp being turned on, in response to processing at least one of the front image data, the front detection data, and the side detection data, detect a side object located on a side of the vehicle; and
output a steering signal of a steering device of the vehicle or a warning signal of the vehicle based on the detection of the side object, and
wherein the controller is configured to:
compare a distance between a front object, located in front of the vehicle, and the vehicle and a distance between a front side object, located on a front side of the vehicle, from the vehicle;
in response to a comparison result that the distance between the front object and the vehicle is greater than the distance between the front side object and the vehicle, detect a rear side object located on a rear side of the vehicle; and
in response to the detection of the rear side object, output the warning signal of the vehicle.

\* \* \* \* \*